United States Patent
Cross et al.

(10) Patent No.: US 9,432,617 B2
(45) Date of Patent: Aug. 30, 2016

(54) WHITE BALANCE ADJUSTMENT OF AN IMAGE AT AN INFORMATION HANDLING SYSTEM

(75) Inventors: Kyle Cross, Pflugerville, TX (US);
Carlton Andrews, Austin, TX (US);
Thomas A. Shows, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 1082 days.

(21) Appl. No.: 13/094,460

(22) Filed: Apr. 26, 2011

(65) Prior Publication Data

US 2012/0274724 A1 Nov. 1, 2012

(51) Int. Cl.
*H04N 7/14* (2006.01)
*H04N 9/73* (2006.01)
*H04N 5/235* (2006.01)

(52) U.S. Cl.
CPC .............. *H04N 7/141* (2013.01); *H04N 5/235* (2013.01); *H04N 9/735* (2013.01)

(58) Field of Classification Search
USPC ........ 348/14.01–14.09, 223.1, E17.002, 370; 382/274
See application file for complete search history.

(56) References Cited

U.S. PATENT DOCUMENTS

| | | |
|---|---|---|
| 7,027,659 B1 | 4/2006 | Thomas |
| 7,825,948 B2 | 11/2010 | Van Geest |
| 2006/0082676 A1* | 4/2006 | Jenkins et al. ................ 348/362 |
| 2008/0198920 A1 | 8/2008 | Yang |
| 2009/0215533 A1 | 8/2009 | Zalewski |
| 2010/0328475 A1 | 12/2010 | Thomas |
| 2012/0007940 A1* | 1/2012 | Michrowski .......... H04N 7/147 348/14.07 |

* cited by examiner

*Primary Examiner* — Sunita Joshi
(74) *Attorney, Agent, or Firm* — Terrile, Cannati, Chambers & Holland, LLP; Robert W. Holland

(57) ABSTRACT

Videoconferencing images captured by a video camera in suboptimal lighting conditions are enhanced by analyzing light associated with a portion of the video camera field of view and applying that analysis for white balance of the entire field of view. For example, the face or silhouette of a videoconference participant is detected within the camera field of view so that light within a perimeter of the face or silhouette is analyzed to determine a white balance correction for application to the entire field of view. To reduce the impact of the white balance correction factor based upon the area within a silhouette participant, the image outside the perimeter may be subdued, such as with blurring or dimming.

12 Claims, 2 Drawing Sheets

WHITE BALANCE ADJUSTMENT OF AN IMAGE AT AN INFORMATION HANDLING SYSTEM

BACKGROUND OF THE INVENTION

1. Field of the Invention

The present invention relates in general to the field of information handling system audiovisual communication, and more particularly to white balance adjustment of an image at an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Communication between information handling systems through high bandwidth networks has changed the way that many employees work by making the home office a virtual extension of an employer's office building. Employees working through high bandwidth Internet communications can access documents and e-mail communications from home as readily as from an office location. Employers have recognized that leveraging home office environments by migrating employees to work remotely from home offices provides a number of benefits. One benefit is the reduced costs of maintaining an office environment by sharing offices between employees who also work from home so that less office space is needed for a given number of employees. Another benefit is that employees appreciate the flexibility offered by the use of home offices, including reduced commute times and expenses. With improvements in video conferencing capabilities, employees can often avoid travel to the office even when meetings require their presence by attending the meetings through video conferencing. Many portable information handling systems integrate a camera and microphone so that users can readily engage in video-conferencing anywhere that network access is available.

One difficulty with remote communications by videoconferencing is that home offices or other remote locations tend to have a wide variance of lighting conditions that generally are substantially inferior to office infrastructure lighting. Office infrastructure lighting tends to have evenly distributed top down fluorescent lighting. Cameras integrated into information handling systems or otherwise used for video-conferencing tend to use white balance solutions to adjust the image captured based upon all of the light in the field of view. White balance works well with office environment lighting conditions that spread light through the field of view by using evenly distributed overhead lights. White balance solutions present a challenge for home video conferencing in home office environments that do not have evenly distributed lighting. For example, low lighting conditions or light "hotspots" tend to throw off white balance so that the image captured by a camera has a low quality. A light hotspot is created when a single light fixture stands out in the field of view, such as a lamp illuminating behind an individual whose image is captured by a camera. As another example, a single light fixture in the center of a room ceiling will create unbalanced light at a desk placed against a wall. A user's face in such a situation is often in a shadow so that illuminated white or bright objects behind the user and in more direct light will influence white or exposure balance of the camera. The reduced exposure of the user's face will provide a poor image quality even with good quality imaging software and hardware components.

SUMMARY OF THE INVENTION

Therefore a need has arisen for a system and method which supports improved image quality captured of a user in a videoconference in inferior lighting conditions.

In accordance with the present invention, a system and method are provided which substantially reduce the disadvantages and problems associated with previous methods and systems for capturing images at an information handling system to support a videoconference. White balance analysis is performed on a limited portion of an image captured by a camera. A white balance correction determined from analysis of the limited portion is applied across the image so that desired portions of the image have improved quality.

More specifically, an information handling system includes a processor and memory to establish a video conference between a sending location and receiving location. A white balance module executing at the sending location analyzes a predetermined object within a video camera's field of view to determine a white balance correction, such as an area within a perimeter of a silhouette of a human form or face. An image analyzer detects the object, such as by using a depth camera to create a depth map that aids in determining objects based on distance from a camera. The white balance correction determined from the area within a perimeter of a human face or silhouette is applied across the field of view so that the human form or face has an improved quality. Areas of the field of view outside of the analyzed perimeter are presented as a subdued background to de-emphasized image portions with a lower quality. For example, areas outside of the perimeter of the human form or human face are presented with dimming or blurring.

The present invention provides a number of important technical advantages. One example of an important technical advantage is that improved quality is provided of images taken by an information handling system to support a videoconference. Analysis of an image to detect a user's silhouette allows white balance optimization for a video-conferencing participant's face while minimizing the impact of light hotspots and other irregularities on the captured image of a face. Capture images in the camera field of view outside of the participant's facial silhouette may be presented "as is" or with blurring or dimming effects to emphasize the face of the video conference participant and minimize the impact of presentation of images that are not corrected for white balance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Videoconference participant images captured and presented by information handling systems are enhanced with a modified white balance based upon a participant's silhouette as detected by a depth camera or similar image analyzer. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
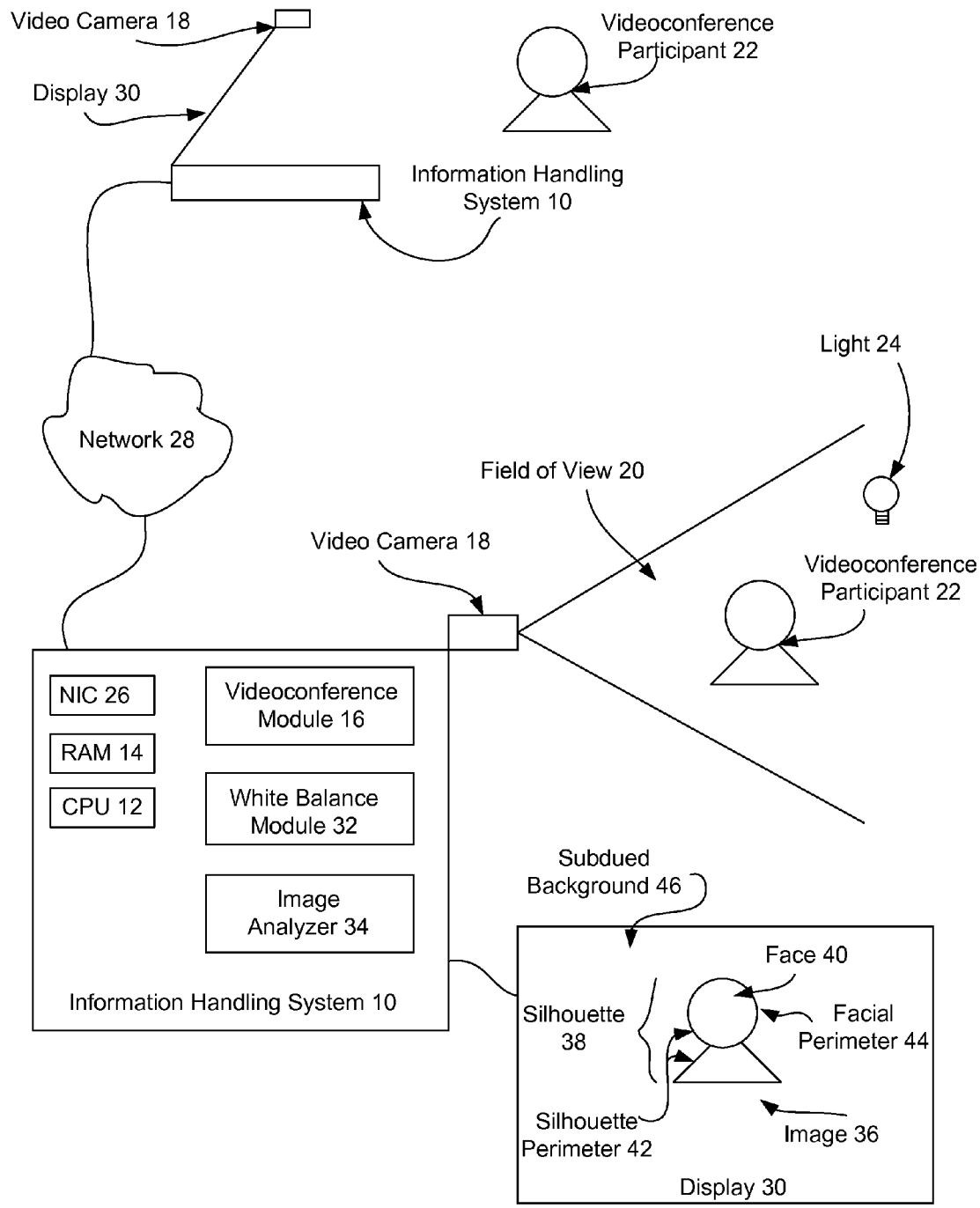
FIG. 1 depicts a block diagram of information handling systems configured to videoconference with a modified white balance correction to video camera images.

Referring now to FIG. 1, a block diagram depicts information handling systems 10 configured to videoconference with a modified white balance correction applied to video camera images. Information handling system 10 processes information with a processor 12 running in cooperation with memory 14, such as by running a videoconferencing module application 16 that allows end users to communicate audio-visual information. A video camera 18 disposed at each information handling system 10 gathers images of objects in a field of view 20, such as an image a videoconferencing participant 22 and a background light bulb 24. Video camera 18 generates digital visual information of images captured in field of view 20 and provides the visual information to videoconferencing module 16 for use in a video conference. Videoconferencing module 16 communicates the visual information through a network interface card 26 and a network 28 to a receiving information handling system 10 for presentation of the visual information as images at a display 30.

In order to provide a video conference visual image with consistent quality, video conference module 16 includes a white balance module 32, which attempts to adjust captured images for the lighting conditions at location where the images are captured. Conventional white balance adjustments, also known as color or exposure adjustments, may be supported with firmware or application instructions running on video camera 18, processor 12 or other physical components associated with videoconferencing, such as a chipset or specialized graphics card. Conventional white balance analysis considers all of the light captured in field of view 20 when determining a white balance or exposure correction to apply to visual information captured by video camera 18. In the example embodiment depicted by FIG. 1, light 24 tends to skew the white balance correction by presenting a bright spot that is emphasized in the captured image while other objects are dimmed.

An image analyzer 34 provides an improved image 36 for presentation at display 30 by analyzing the objects in field of view 20 and limiting white balance module 32 to consider light associated with only a portion of the objects in field of view 20 when determining the white balance correction. In the example embodiment image analyzer 34 detects a human silhouette 38 or human face 40 and defines a perimeter about the desired object, such as silhouette perimeter 42 or facial perimeter 44. Image analyzer 34 then directs white balance module 32 to limit the white balance analysis to light detected within the boundary of the desired perimeter and to determine a white balance correction for the entire field of view 20 based only upon the analysis within the perimeter 42 of 44. Image analyzer 34 detects objects to use for white balance analysis using a variety of techniques, such as facial recognition software analysis. In one example embodiment, image analyzer 34 uses a depth camera analysis to determine the location of video conference participant 22 in field of view 20. A depth camera generates a depth map to identify a silhouette that is used for white balance analysis while ignoring visual information outside of the silhouette. In this manner the image passed through videoconference software is optimized for quality at the participant's information handling device while ignoring irrelevant hotspots and brightness irregularities that occur outside of the participant's silhouette. Image analyzer 34 minimizes the impact of suboptimal white balance correction outside the participant's silhouette by generating a subdued background 46 in the image outside of the silhouette, such as by dimming or blurring subdued background 46. For example, in the example embodiment of FIG. 1, subdued background 46 dims the image of light 24 so that videoconference participant 22 remains the primary object presented in the image displayed from that captured by video camera 18.

Figure 2:
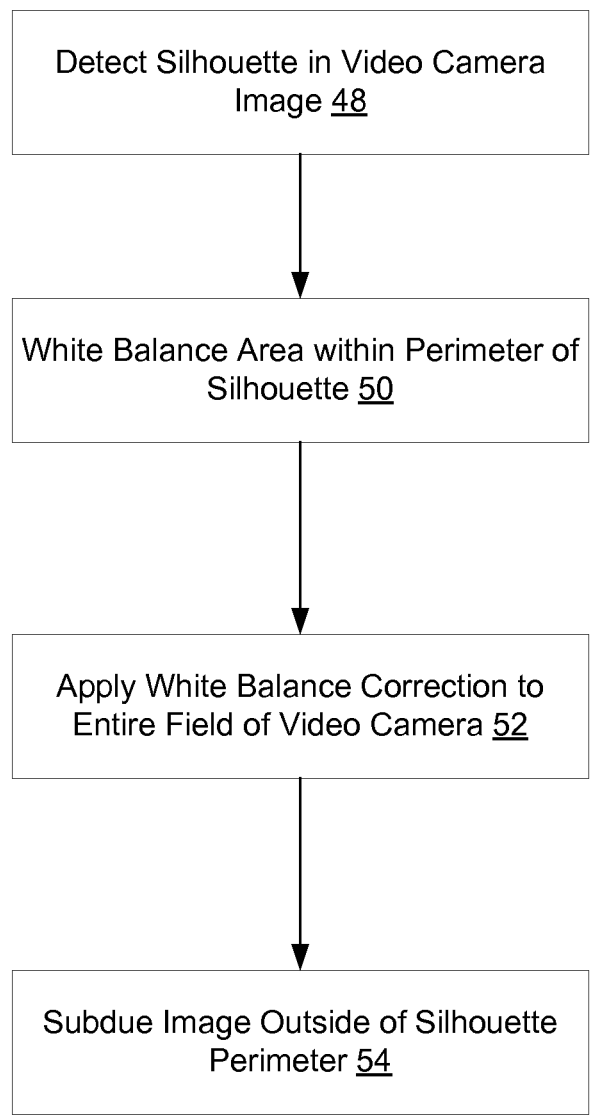
FIG. 2 depicts a flow diagram of a process for presenting a video conference with modified white balance correction to video camera images.

Referring now to FIG. 2, a flow diagram depicts a process for presenting a video conference with modified white balance correction to video camera images. The process begins at step 48 with detection of a human silhouette within the field of view captured by a video camera. For example, a depth camera provides a depth map that allows detection of a human form or human face within an image captured by a video camera. At step 50, a white balance analysis is performed on the portion of the image associated within the perimeter of the silhouette. For example, only light captured within the perimeter of the silhouette is analyzed for purposes of performing white balance analysis while light outside of the perimeter of the silhouette is ignored in determining a white balance correction. At step 52, the white balance correction determined from analysis within the perimeter of the silhouette is applied to the entire field of view to adjust the presentation of the image captured by the video camera. At step 54, the background of the image outside of the silhouette perimeter is subdued so that the video conference participant corrected with optimal white balance is presented without distractions from objects behind his image. The image is then ready to send through a network for presentation at receiving location of the videoconference.

Although the present invention has been described in detail, it should be understood that various changes, substitutions and alterations can be made hereto without departing from the spirit and scope of the invention as defined by the appended claims.

What is claimed is:

1. A method for capturing an image to communicate in a videoconference, the method comprising:
   capturing an image within a field of view of a camera located at a sending location of the videoconference;
   analyzing the image to detect a predetermined object within the image, the object having a perimeter;
   performing a white balance of the entire image based upon an analysis of light associated with the perimeter and excluding light outside the perimeter; and
   communicating the image to a receiving location of the videoconference.

2. The method of claim 1 wherein the predetermined object comprises a human face.

3. The method of claim 1 wherein the predetermined object comprises a human silhouette.

4. The method of claim 1 wherein analyzing the image further comprises generating a depth map to detect the predetermined object.

5. The method of claim 1 wherein performing a white balance of the image based upon an analysis of light associated with the perimeter further comprises analyzing light associated with the perimeter and disregarding light outside of the perimeter.

6. The method of claim 1 further comprising blurring the image outside of the perimeter.

7. The method of claim 1 further comprising dimming the image outside of the perimeter.

8. A method for capturing an image with a video camera, the method comprising:
   analyzing the field of view to define a perimeter of an object within the field of view;
   analyzing light associated with an area defined within the perimeter to determine a white balance correction for the area; and
   applying the white balance correction for the area to the entire field of view.

9. The method of claim 8 further comprising subduing the image captured outside of the perimeter.

10. The method of claim 9 wherein subduing the image further comprises dimming the image captured outside of the perimeter.

11. The method of claim 9 wherein the object comprises human silhouette.

12. The method of claim 11 further comprising sending the image through a network as a videoconference video.

* * * * *